United States Patent [19]

Caputo

[11] Patent Number: 5,188,691
[45] Date of Patent: Feb. 23, 1993

[54] APPARATUS AND METHOD FOR PRODUCING AIR CUSHION PRODUCT

[76] Inventor: Gary L. Caputo, 464 Riverside Ave., Rutherford, N.J. 07070

[21] Appl. No.: 692,178

[22] Filed: Apr. 26, 1991

Related U.S. Application Data

[63] Continuation of Ser. No. 382,579, Jun. 21, 1989, abandoned, which is a continuation-in-part of Ser. No. 213,254, Jun. 29, 1988, abandoned, which is a continuation-in-part of Ser. No. 78,385, Jul. 27, 1987, abandoned.

[51] Int. Cl.$^5$ ............................................. B32B 31/12
[52] U.S. Cl. .................................... 156/145; 156/209; 156/292; 156/308.4; 156/309.9; 156/499; 156/471; 156/498; 156/555; 425/388
[58] Field of Search ............... 156/498, 145, 209, 289, 156/555, 292, 308.4, 309.9, 499; 425/388, DIG. 60; 226/95

[56] References Cited

U.S. PATENT DOCUMENTS

| | | | |
|---|---|---|---|
| 3,208,898 | 9/1965 | Chavannes et al. | 156/498 |
| 3,655,486 | 4/1972 | Hagino et al. | 156/498 X |
| 4,412,879 | 11/1983 | Ottaviano | 156/145 |
| 4,576,669 | 3/1986 | Caputo | 156/209 X |
| 4,579,516 | 4/1986 | Caputo | 156/498 X |

Primary Examiner—Jeff H. Aftergut
Attorney, Agent, or Firm—Patrick J. Pinto

[57] ABSTRACT

An improved apparatus and method for producing fully air-cushioning dunnage from two sources of flexible thermoplastic film. This improved apparatus and method provides a fully air-filled dunnage by maintaining a forming roller (16) at a cold temperature. The outer surface (33) has a thermo-resistive layer (32) completely convering its periphery absent a plurality of cavities (30) formed therein. A first film (12) is heated then thermoformed into said cavities (30). The thermoformed portions of the film contact the cold cavities in the forming roller to cool both the film and the air in the cavities to a cold temperature. The heat welding surface of first film (12) is kept at an elevated temperature by the thermo-resisitive layer. A second film (20) is heated and welded to said first film by and with an adjustable heated pressure roller (24). The heat traveling through the second film and the first film is delayed for a predetermined amount of time by the thermo-resistive layer. Subsequently the laminated first film and second film are cooled to a set temperature by the conduction of heat through the thermo-resistive layer into the cold forming roller. The air filled dunnage is then removed from the forming roller and contacts a chill roller whereat the second film is chilled to prevent any premanent thermal distortion of said air filled cells.

20 Claims, 9 Drawing Sheets

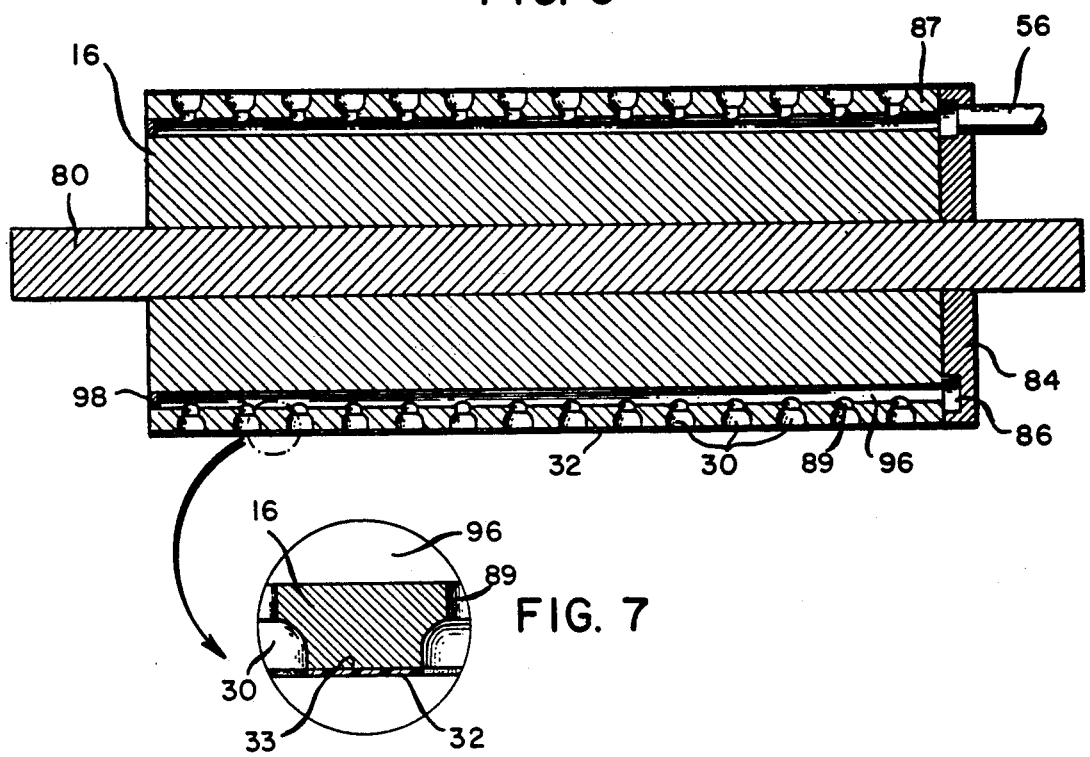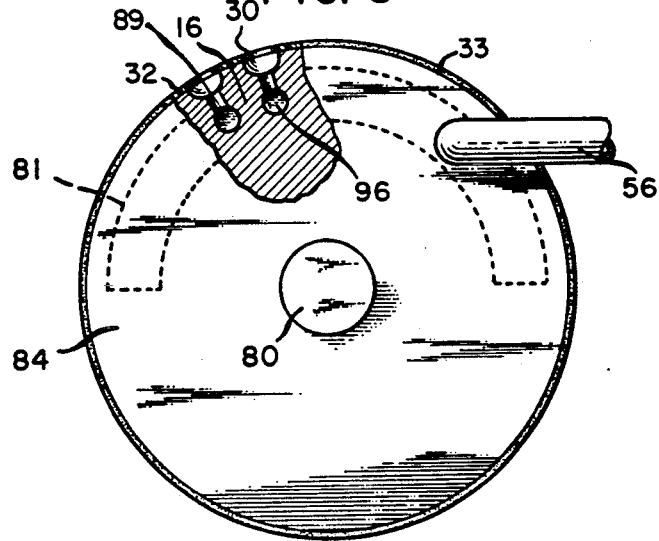

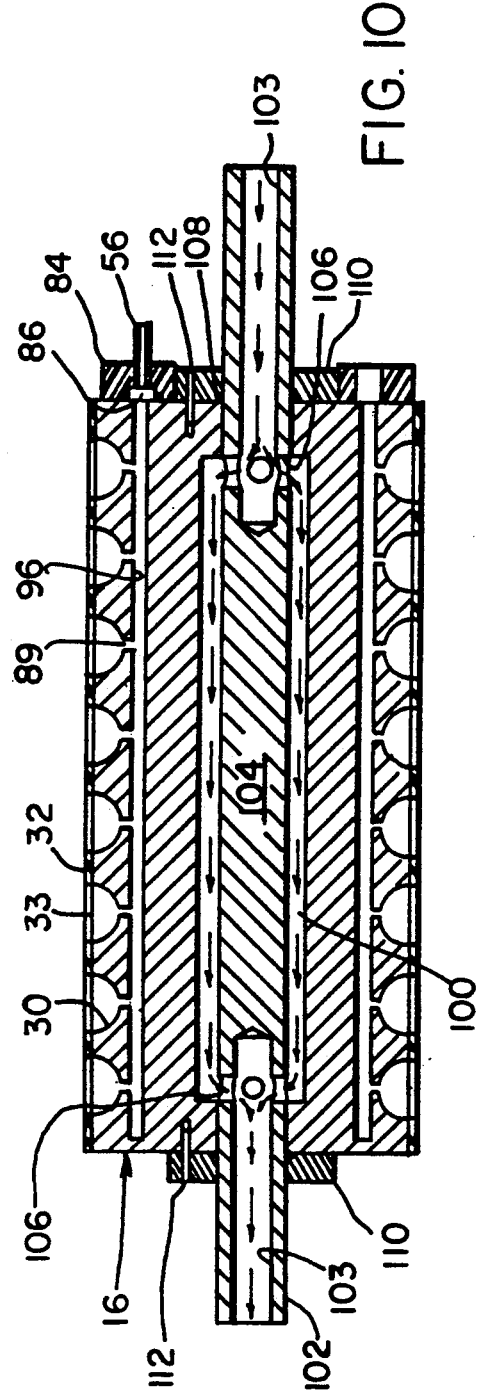
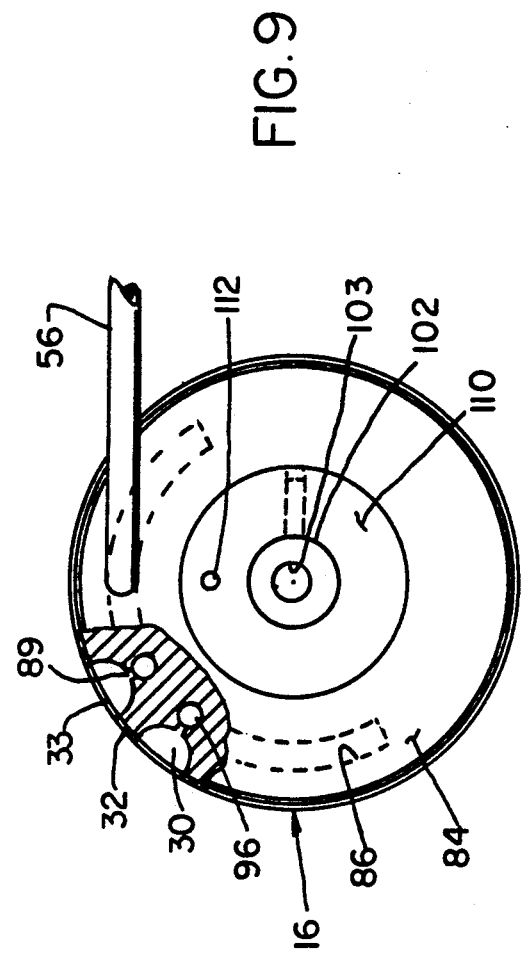
FIG. 10
FIG. 9

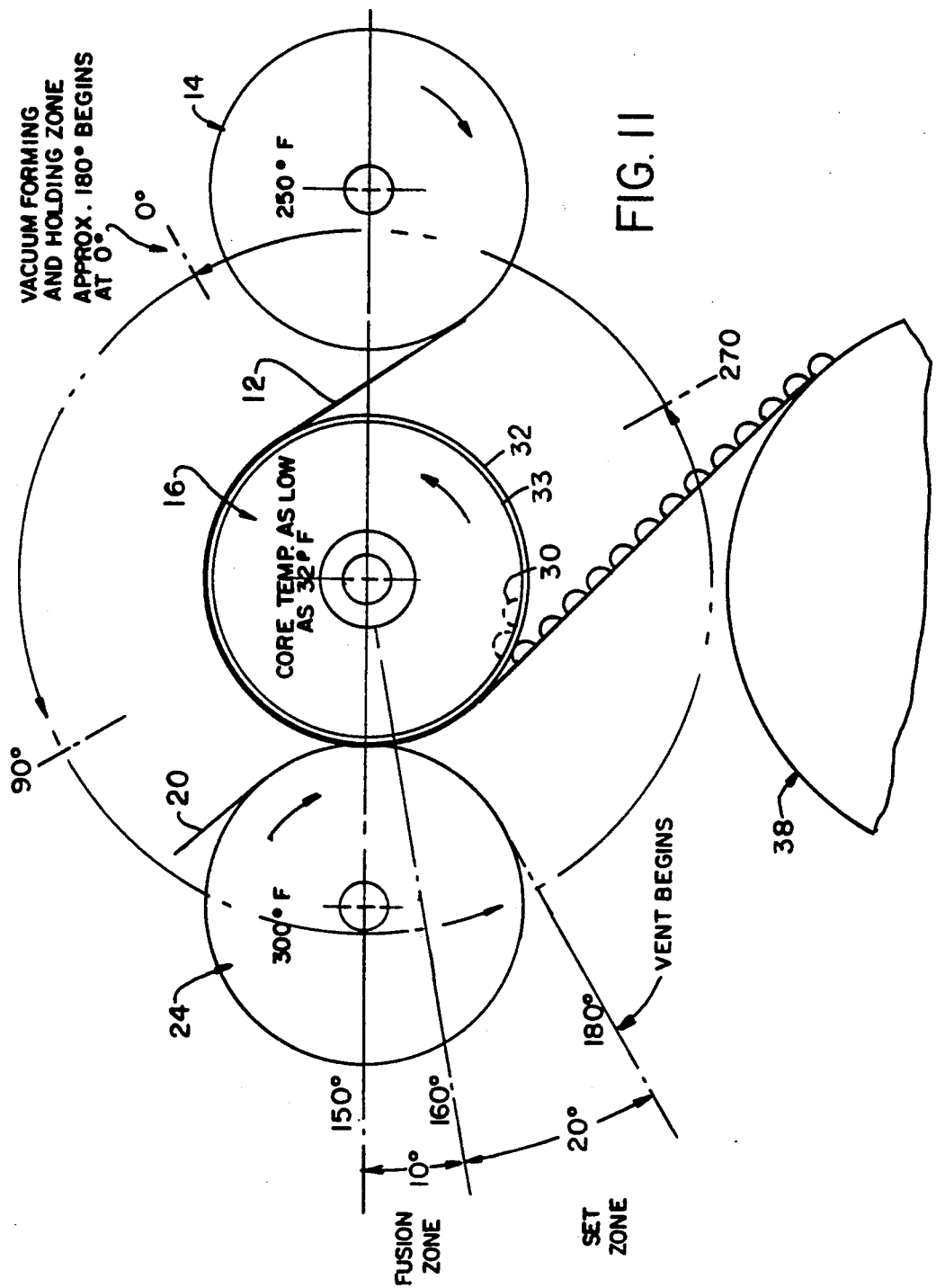

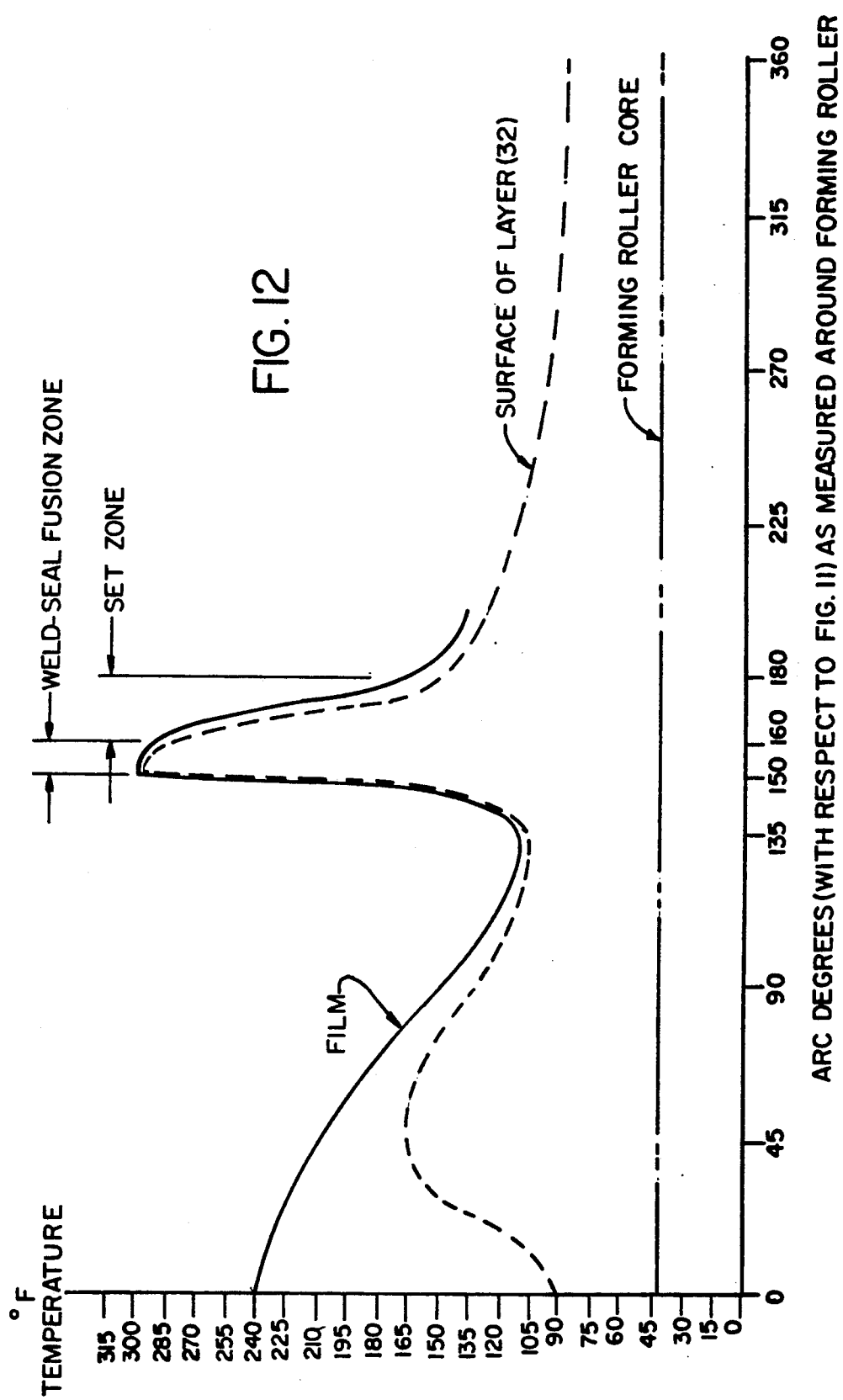

APPARATUS AND METHOD FOR PRODUCING AIR CUSHION PRODUCT

This application is a continuation of patent application Ser. No. 07/382,579, filed Jun. 21, 1989, now abandoned, which is a continuation-in-part application of Ser. No. 07/213,254, filed Jun. 29, 1988, now abandoned, which is a continuation of application Ser. No. 07/078,385, filed Jul. 27, 1987, now also abandoned.

This invention pertains to apparatus similar to that disclosed by the applicant in his U.S. Pat. Nos. 4,576,669 issued Mar. 18, 1986; and 4,579,516 issued Apr. 1, 1986. To the extent applicable, reference is made to these patents.

FIELD OF THE INVENTION

The present invention generally relates to machines which produce air-cushioning material such as material used as protective packaging dunnage. The present invention more particularly relates to improvements directed to forming rollers used in such machines and improved methods for producing such air-cushioning material.

BACKGROUND OF THE INVENTION

Air-cushioning material is commonly used in the manufacturing and packaging industry as an effective packing dunnage to protect packaged products. This particular dunnage product utilizes a flexible plastic sheet laminate which includes a multitude of encapsulated air pockets. Each air pocket acts to cushion an abutting product in a container or package against impact during shipping and handling.

Other commonly used dunnage materials include various shapes of extruded polystyrene plastic, such as hemispherical cup shapes, spiral "s" shapes ("worms"), and tubular pellets Foam rubber, foamed plastics and expanded polyurethane foam material can also be used, as well as rolled-up newspaper and popped popcorn.

Air-cushioning material is generally a preferred packing dunnage over the above-listed alternatives because it is lightweight, can be supplied and dispensed in a controlled manner, i.e., the air-cushioning dunnage can be provided in a supply roll form and applied to the product in sheet form. Furthermore, the air-cushioning material can be wrapped around the product prior to packaging and still provide effective cushioning characteristics over that provided by newspaper, for example. Loose dunnage alternatives such as polystyrene pieces, foam rubber pieces and popped popcorn include the disadvantage of being difficult to remove from the package and dispose of once the product is removed. In contrast, the air-cushioning dunnage can be removed as a one-piece sheet and flattened (deflated) and rolled to a compact size for easy disposal or reuse.

Unfortunately, use of air-cushioning material as packing dunnage also includes problems. These problems primarily stem from the availability of the supply of air-cushioning dunnage by a manufacturer or other user. The currently available machines for producing the air-cushioning material are large, heavy machines designed to produce the air-cushioning material in great volumes. These machines are generally owned and operated by companies that produce and sell the dunnage material to product manufacturers which, in turn, use the air-cushioning dunnage to protect their packaged products. The users of the dunnage material become dependent on the dunnage-producing companies and therefore, commonly purchase and store a large quantity to avoid availability problems. The air-cushioning dunnage material is already produced, i.e., filled with encapsulated air pockets prior to storage by the manufacturer, and therefore, requires a large area for storage.

Product manufacturers and other dunnage consumers located in or near a city find difficulty reserving valuable space for storage of dunnage supply. The space requirement is especially difficult to meet on board military and merchant sea going ships which use the dunnage to protect various on-board equipment and packages against damage in rough seas, for example.

Currently available machines for producing the air-cushioning material include complex heat controlling systems for regulating the temperature of various parts (forming and heated rollers) which assist in producing the encapsulated air pockets within the plastic sheet laminate.

The method and apparatus for producing air-cushioning dunnage typically includes two supplies of a heat-sealable plastic sheet which can be heated to a temperature suitable for heat-softening, heat welding or heat-melting, as required during the process. In the prior art process for producing air-cushioning dunnage a first plastic sheet is heat-softened and brought into contact with a forming roller which includes a multiplicity of cavities. Vacuum is applied from within the forming roller to the extent that a pre-softened portion of the sheet is drawn into the cavities, thus forming "open" air-pockets into the sheet. The vacuum is active only along one portion of the forming roller. The forming roller typically used in the prior art process is quite large having a diameter of up to three feet and slowly rotates at a rate less than three RPM. Such large forming rollers allow the manufacturer to precisely control the surface temperature of the roller at various important positions (arc-degree-sections) along the roller's surface, as discussed below. Unfortunately, such precise temperature control cannot be effectively obtained with a smaller, more compact roller using the same temperature control method. The compactness of the prior art machines is limited by the method used to make air-cushioning material.

After the first sheet is formed with "open" air-pockets or bubbles the material enters a region of the forming roller which is heated to a much higher temperature sufficient to heat-weld the plastic to an adjacent second plastic sheet supply which is also heated to the same heat-weld temperature. The second supply of plastic sheet is typically drawn along a heated roller (which has a smooth surface, no cavities). The heated roller is abutted against the forming roller to the extent that the two plastic sheet supplies contact each other, forming a heat-weld. The once "open" air-pockets (bubbles) become "closed" and sealed by the welded second plastic sheet.

Once the weld between the two plastic sheets is made, the formed dunnage, still in contact with the forming roller enters a cooled region of the forming roller which allows the laminate to cool to a more stable temperature so that it can be removed from the forming roller without damage. The plastic sheet laminate including the formed air-pockets leaves the forming roller and is usually further cooled using a remotely located cooling roller. The air-cushioning laminate is then rolled and cut to form dunnage supply rolls which are eventually sold to manufacturers in bulk.

The surface of the prior art forming rollers, as it rotates, is continuously heated and cooled. The temperatures achieved at the various arc-degree locations along the surface are critical if good quality dunnage is to be formed (good quality dunnage includes greatly inflated air bubbles sealed by strong heat-welds around each bubble without any melting deformations or burn spots). The surface of the prior art forming rollers are typically heated with an external electric heating element and cooled centrally with a flow of cooling fluid such as air mist or a liquid coolant. Any heat generated along the roller's surface is immediately drawn towards the cooler center. The prior art method of forming the air-cushioning material does not provide a forming roller that cools the formed thermoplastic sheet just prior to heat-welding. The prior art technique generates a surface heat-weld temperature a few degrees before the point of welding and sealing the air-pockets. The air-pockets formed by this prior art method are therefore, very hot prior to and during the welding procedure. The result is sealed air-pockets that are slightly deflated when finally cooled.

In contrast, the present invention provides an air-cushioning producing machine having a non-heated forming roller which maintains the formed air-pockets, and the air within the "open" pockets at a cool temperature throughout the procedure so that the resulting sealed air-pockets do not deflate as a result of differences between internal and external temperatures.

The use of such prior art air-cushioning machines requires careful temperature control of the forming (and heated) roller. Such temperature control requirements together with the prior method of forming air-cushioning material prevent the use of an air-cushion producing machine which is lightweight, simple, compact and inexpensive to the extent that individual dunnage users can own and operate the machine locally and thereby eliminate the dependence on dunnage producers. Such compact dunnage machines can be easily operated adjacent the packaging operation of a product manufacturer (or user) including use on board ships.

There are a number of patents in the particular field of air-cushioning dunnage production, such as, Australian Pat. No. 160,551, published Oct. 29, 1953, and U.S. Pat. Nos. 3,018,015; 3,142,599; 3,231,454; 3,285,793; 3,349,990; 3,577,305; 3,389,534; 3,523,055; 3,575,781; 3,616,155; 3,785,899; 3,817,803; 3,837,990; 3,837,991; 3,868,056; 4,076,872; and 4,096,306. In addition, U.S. Pat. Nos. 3,416,984 and 3,392,081 show basic construction methods and U.S. Pat. Nos. 4,415,398 and 4,427,474 show plural sheets and/or drum roller apparatus. In general, the prior art apparatus are directed to high-volume production with, as discussed above, the resulting dunnage product sold in bulk (typically in the form of rolls) to product manufacturers and other dunnage consumers. The prior art machines all heat the forming roller in order to weld the film together. In contrast, the present air-cushioning machine is intended for use within the product manufacturing building, in the product packing room, for example. The dunnage produced by the present machine can either be rolled and stored for future high demand periods, or produced and immediately used, directly from the machine to the package, following an as-it-is-needed schedule. In either case, the simplicity of the present apparatus enables interruption of dunnage production and, when required, easy repair of the apparatus.

The prior art apparatus and methods for producing air-cushioning dunnage do not anticipate the forming of dunnage using plies of thermoplastic film having a thickness less than one mil. The present apparatus is capable of producing air-cushioning dunnage material using thermoplastic plies, each being one-half mil in thickness. By being able to use such thinner plies to make the dunnage, the resulting dunnage material is less expensive and lighter. Lightweight packaging dunnage is particularly important where items packed with such dunnage are shipped by air.

SUMMARY OF THE INVENTION

The present invention provides an "on-demand" apparatus and method for the production of air-cushioning dunnage from flexible sheet material supplies. The present apparatus producing air-cushioning dunnage from two sources of flexible thermoplastic film which is the type which may be combined to provide isolated air-filled cells. The present apparatus comprises a first supply of thermoplastic film having thermo-forming and heat-welding properties when softened with heat and a second supply of thermoplastic film having heat-welding properties when heated. A feeding means delivers the first and second film supplies independently to the apparatus. A means for heat-softening a preselected portion of the first film supply to a temperature sufficient to provide the first film supply with the thermo-forming properties. The present machine also includes a forming roller having a central core and an outer surface, said outer surface having a plurality of cavities. The roller being adapted to receive the heat-softened portion of the first film supply so that a forming portion of the outer surface of the forming roller contacts the film. A means for creating a vacuum within the cavities located within the forming portion of the forming roller. The created vacuum is sufficient to draw the heat-softened portion of the first film supply into the cavities causing the first film supply within the forming portion to form a shape similar to the shape of the cavities within the forming portion on the forming roller. A heated pressure roller positioned adjacent to the forming roller and adapted to receive the second film supply so that the first and second film supplies are in contact at a contact portion of the adjacent rollers. Heat generated by the heated pressure roller conducts through the outer surface of the forming roller to the core of the forming roller. The second film supply is heated to a heat-weld temperature upon contact of the heated pressure roller prior to reaching the contact portion of the heated pressure roller. The present machine further includes a thermo-resistive layer of predetermined thickness which is formed on the outer surface of the forming roller around said cavities. The thermo-resistive layer is such that the conduction of the generated heat energy of the adjacent heated pressure roller to the core of the forming roller is delayed at the outer surface of the forming roller around the cavities. The duration of the heat conduction delay is controlled by the predetermined thickness of the thermo-resistive layer. The duration is sufficient to heat the first film supply to the heat-weld temperature so that the first film supply is heat-welded to the second film supply at the contact portion of the adjacent rollers. The heat conduction delay ends after the heat-weld is formed between the film supplies, thereby allowing the generated heat energy to continue conduction towards the core of the forming rollers. A driving means is used to drive the forming roller and the heated pressure roller at a selected rate of rotation. A cooling means is used to cool the heat-welded portion of the film supplies to a temperature which removes the thermo-forming properties of the film supplies so that the first film supply retains the formed shape of the cavities.

It is an object of the present invention to provide a simple, efficient and compact machine for producing air-cushioning dunnage.

It is another object of the present invention to provide such an air-cushioning machine with a forming roller including a thin coating of predetermined thickness of an insulating/resilient material that provides a layer of delayed heat conductance so that the surface of the forming roller can utilize heat energy from an adjacent heating roller in a controlled and consistent manner to bring a first supply of thermoplastic sheet to a heat-weld temperature at a point of welding to a second sheet of thermoplastic and maintain the necessary temperatures to ensure a good quality weld.

It is another object of the present invention to provide a method to produce air-cushioning material using the present apparatus.

BRIEF DESCRIPTION OF THE DRAWINGS

FIG. 6 is a side, sectional view of the forming roller of the present invention;

FIG. 7 is an enlarged partial view of the forming roller of FIG. 6, showing detail of a surface portion of the forming roller;

FIG. 8 is a sectional in part view of one end of the forming roller;

FIG. 9 is a sectional in part view of an end of another embodiment of the forming roller of the present invention;

FIG. 10 is a partially sectional side view of the forming roller shown in FIG. 9;

FIG. 11 is a representative side view of the forming roller, heated roller and preheated roller of the present invention; and FIG. 12 is a temperature graph showing, as an example, the related temperatures of the forming roller core and surface and the film along various arc degrees of the forming roller.

DETAILED DESCRIPTION OF THE PREFERRED EMBODIMENT

Figure 1:
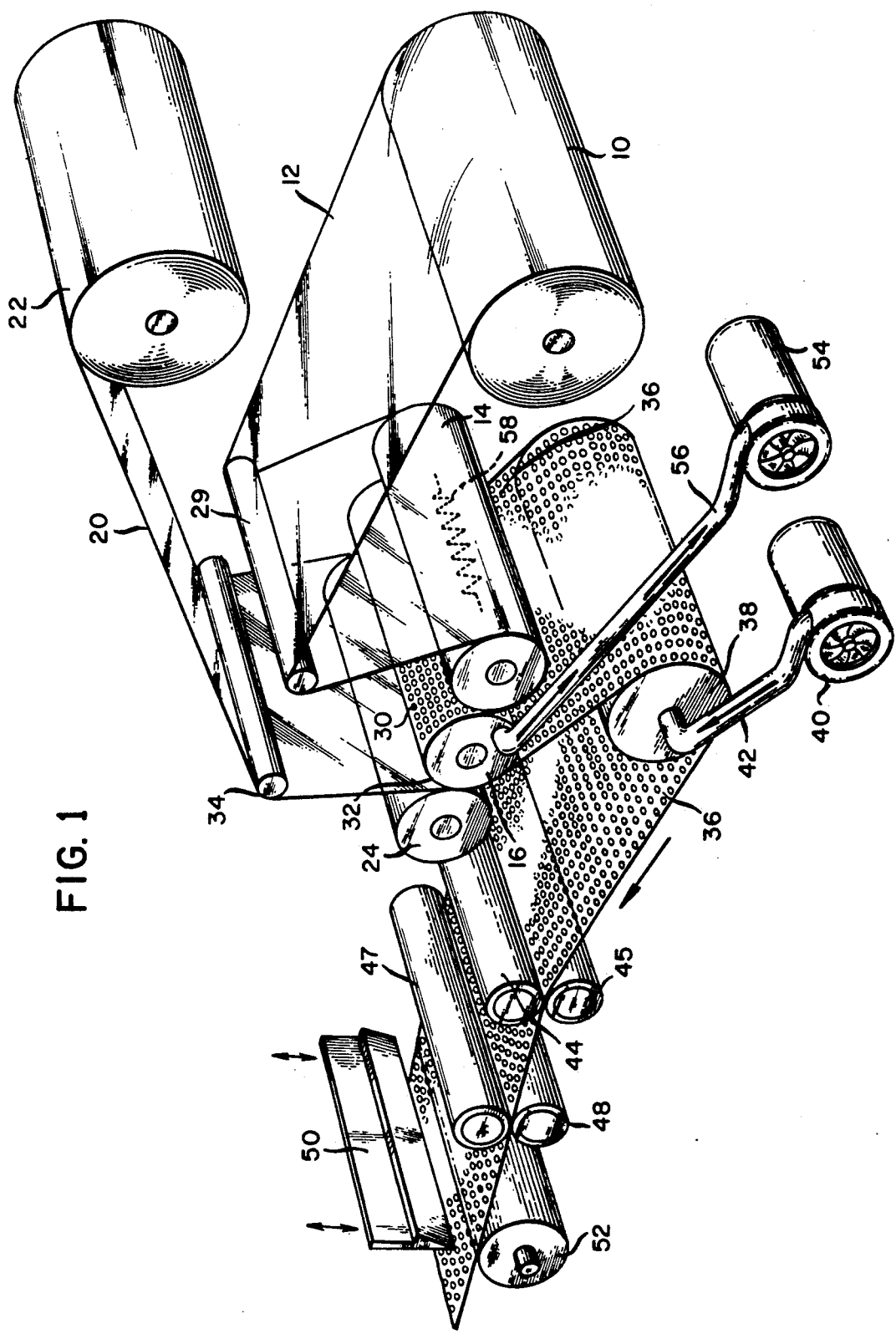
FIG. 1 is an isometric, partly diagrammatic view of one embodiment of the present air-cushion producing machine.
Figure 2:
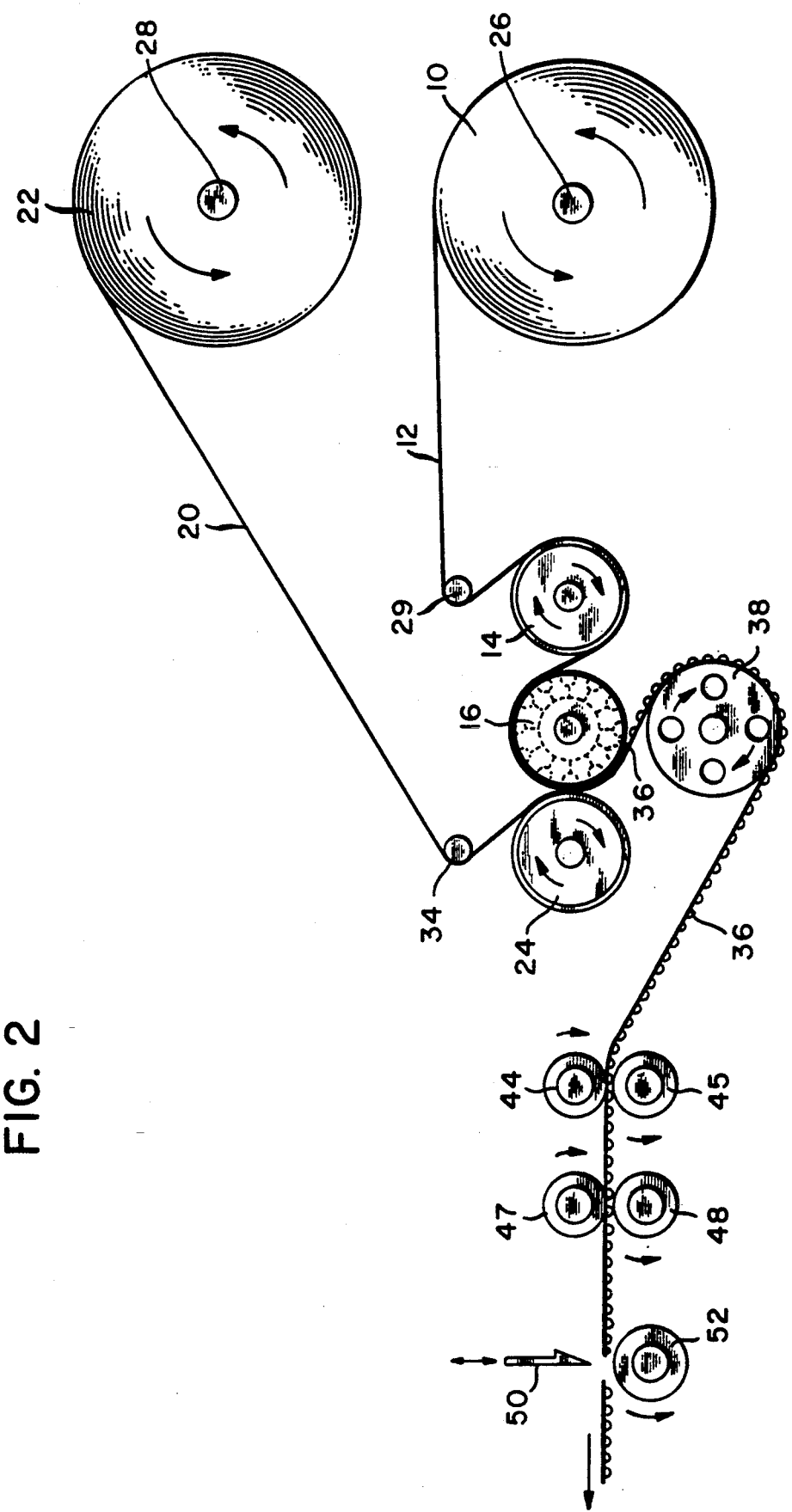
FIG. 2 is a side, diagrammatic view of the present invention shown in FIG. 1.

Referring to FIGS. 1 and 2, the general arrangement of the preferred embodiment of the present invention is shown to illustrate the economy of components and the operation required to produce the air-cushioning material. All the rollers and rolls hereinafter described (unless otherwise stated) are substantially cylindrical including 360 arc degrees, centered about individual axes which are parallel to each other. Furthermore, unless otherwise stated, the journals and supporting shafts of the rollers can be conventional and, for the most part are not shown in the figures to maintain clarity.

The present machine requires two supply rolls of thermoplastic film (or equivalent). One supply roll 10 holds film 12 into which open air-pockets will be formed. The second supply roll 22 holds the second film 20 which will be later used to seal the air-pockets formed into the first film 12. As shown in FIGS. 1 and 2, the web of film 12 from roll 10 is fed to a first heater roller 14 by way of an idler roller 29. The idler roller 29 is positioned relative to the first heated roller 14 so that the film 12 wraps around the surface of the heated roller 14 a preferred amount of 180 arc degrees. The preferred amount of wrap around the heated roller depends on the thickness and material of the film and the temperature of the heated roller 14. In general, the thicker the film used, the more material needed to be preheated and therefore, the greater the wrap around the heated roller 14. The idler roller 29 can be carried on an adjustment arm (not shown) so that the wrap around the heated roller 14 can be adjusted.

The second web of film 20 is directed from roll 22 to a second heated roller 24 by way of an idler roller 34. Similar to the idler roller 29, the idler roller 34 is adjustable and controls the degree of wrap, in this case around the second heated roller 24. Both heated rollers 14 and 24 are preferably made from a strong lightweight thermally conductive material, such as aluminum or steel. Both heated rollers 14 and 24 are preferably heated using an internally disposed electrical heating element (such as heating element 58 shown positioned in heated roller 14 in FIG. 1). It is preferred that a thermostatic control of the type known be used to regulate the surface temperature of the heated rollers 14 and 24. Alternative heating means can be employed to heat the surface of the heated rollers. These alternative means include the use of hot water (or any fluid) circulated along a path passing through the heated rollers. However, in order to maintain simple construction and temperature control of the present invention, an electrical heating element is preferred.

One embodiment of a forming roller 16 is shown in FIGS. 1-8 is used to form "open" air-pockets in the first film 12. The forming roller 16 includes a surface 33 into which a plurality of specifically shaped cavities 30 which are disposed, preferably symmetrically. As described in greater detail below, at a prescribed moment in the forming process, a portion of the forming roller 16, such as at least one row of cavities 30 (a row is defined parallel to the central axis of the roller) is influenced by vacuum. The purpose of the vacuum is to draw in a portion of the heat-softened film 12 which is in contact with the surface 33 of the forming roller 16 into the selected row (or rows) of cavities 30 so that the heat-softened film material 12 is formed to the shaped dictated by the shape of the cavities 30.

The forming roller 16 is an important part of the present invention. In this preferred embodiment, it measures only 3¼ inches in diameter. As described below, the improvements made herein to the forming roller 16 eliminate an otherwise required heating and cooling steps. The elimination of the heating and cooling steps helps reduce the overall size of the air-cushion producing machine.

In this preferred embodiment, the forming roller 16 is not heated, which differs from the prior art forming rollers. The forming roller 16 is constantly cooled using any centrally directed fluid such as flowing water, air or a suitable refrigerant such as freon. In contrast to the prior art methods of forming air-cushioning material, the present forming roller 16 can operate effectively at forming roller temperatures below 32 degrees F. without the need to preheat the roller before initial operation.

The present machine eliminates the costly forming roller heating step through the addition of a layer onto the outer surface 33 of the forming roller 16. A thin layer 32 of an insulating material such as resilient silicone rubber is positioned along the surface 33. One main function of this insulative/resistive layer 32 is to prevent any remotely generated heat that reaches the surface of the layer 32 [33 of the forming roller 16] from conducting to the cooled core too quickly. As described below, the delay of the absorbed heat allows the surface of the layer 32 [33] and the adjacent film to reach and maintain the necessary temperatures for welding (nipping).

The present layer 32 is intended to provide at least the following functions:

1. to act as a releasing surface to avoid surface adhesion of the heated film;
2. to act as a specifically designed and controlled heat insulator (as opposed to a general bulk insulator) for the specific purpose of controlling the rate of heat flow per arc degree of roller rotation from the adjacent heated roller 24 to the core of the forming roller 16 and therefore, the immediate temperature of the surface of the layer 32 and the film 12 at the point of nipping; and
3. to act as a resilient layer against which the adjacent heated roller 24 may press in order to weld the two films together.

The layer 32 is preferably not located in any portion of the cavities 30 of the forming roller 16, only around them along the surface 33. It is important that no insulator be in the cavities 30 so that the "open" air-pockets will remain "cold" in relation to the surface welding temperatures and will therefore result in a greater inflated bubble. Any insulation within the cavities 30 will prevent the absorbed heat of the "open" air-pockets to readily dissipate into the core of the roller 16 and will result in deflated bubbles.

The prior art machines must heat both the heated roller (equivalent to heated roller 24) and the forming roller (16) prior to the point of weld. Because the prior art forming rollers (16) are several feet in diameter, the surface must be coated with a thick insulator to prevent the initial contact of the heat-softened film from getting too cold before it reaches the prescribed forming location. In other prior art devices, the forming roller (16) is heated in two separate locations, one for heat-softening the film (12) prior to vacuum forming and the other to heat the film (12) up to a heat-welding temperature prior to heat-welding. In either case, the forming roller is heated and does not include a controlled insulating layer.

The present layer 32 of predetermined thickness is adhered to the surface 33 of the forming roller 16 around the cavities 30. The layer 32 keeps the air-pockets cool, but retains absorbed heat in the film around the cavities. The layer is preferably made from a silicone rubber. It must be applied to the roller 16 in a controlled manner to ensure a smooth layer of consistent predetermined thickness. The thickness of the layer depends on the materials used for the two films and the temperature required to heat-weld the two films together. As the forming roller 16 rotates, different surface "line" portions of the roller 16 (small arc segments running the length of the roller) come into physical and thermal contact with an adjacent heated roller 24. The heat generated by the heated roller 24 (and the film 20 carried on it) conducts towards the core of the forming roller 16, through both the film 12 and the adjacent surface of the layer 32 along the surface "line" of contact. As the remotely generated heat conducts to the surface 33 of the cooler forming roller 16, the surface layer 32, being of controlled thickness delays the conduction into the cooler forming roller core. The delay of heat conduction is designed to be just long enough to retain the weld-temperatures of the film 12 after nipping within a "cure" zone (between 150 and 180 degrees arc of roller rotation) shown in FIG. 11. In order to provide strong welds to seal the "open" air-pockets between the plastic films 12 and 20, a period of time is required for the immediately pressed films to cure at sealing temperatures. The cure zone of the forming roller 16, and therefore the amount of delay time necessary to maintain such sealing temperatures during the curing process dictates the thickness of the controlled layer 32. Due to the controlled thickness of the insulative layer 32, once a specified "nipped" portion of bubble material rotates out of the cure zone (see FIG. 11), the heat on the surface of the layer 32 dissipates into the core of the forming roller 16 and the surface temperature becomes cool enough such that the sealed bubble material can be drawn from the surface of the layer 32 without damage or separation of the sealed regions. If the layer 32 is made too thick, the surface temperatures of the forming roller 16 will remain at seal temperatures (or close thereto) for an extended period of time out of the cure zone (past 180 degrees). The result is poor seals between the films due to damage during separation from the forming roller 16. Furthermore, over a period of operating time, the layer (if made too thick) will allow the surface of the forming roller 16 to reach seal temperatures around the entire roller 16. This overheated condition of the surface of the layer 32 will effect the quality of the forming procedure by overheating the cavities 30 (described above) and causing separation damage to the sealed regions. Such an overheated condition would require an inefficient cool-down period of the entire machine.

On the other hand, if the layer 32 is made too thin, the film temperature magnitudes within the cure zone will decrease prematurely as the surface heat easily dissipates into the core of the forming roller 16. In this (too-thin) layer condition, the resulting air-cushioning material would include poor quality sealed regions and leaking bubbles due to the insufficient time at the necessary seal temperatures to cure the seals. Only a layer of proper thickness will "hold" the heat from the heated roller 24 at the surface of the layer 32 of the forming roller 16 within the range of arc degrees allotted by the structure.

In applications where heavy or thick film material (2–7 mils thick) is used, various metals such as aluminum as disclosed by U.S. Pat. No. 4,500,353, or other materials such as fumed silica, as suggested by the present application can be incorporated with the silicone rubber prior to application to the surface 33 of the forming roller 16. The material disclosed in U.S. Pat. No. 4,500,353 describes a suitable method of creating such a mixed layer 32 of silicone rubber and metal particles, such as aluminum, and is hereby incorporated by reference. It has been discovered, and herein disclosed that the methods employed in U.S. No. 4,500,353 for mixing metal to rubber can be used to mix particles of fumed silica with silicone rubber. Such a rubber-based/silica compound is suitable for a forming roller layer 32 that can dissipate surface heat with different characteristics than equal percentages of aluminum particles and can withstand the high contact temperatures of the surface of the layer 32. Fumed silica also does not hinder the resiliency of the rubber-based compound layer 32 so that the necessary pressure can be obtained across the "line" of contact to ensure a good quality nip. If such a silica mixture is used for the layer 32, the layer can be thicker, if necessary, up to about 1/16th of an inch so that the resilient properties can be increased, however, it has been found that thick film stock from 2-7 mils thick will provide additional resiliency and that a layer thickness of about 1/32 of an inch will suffice.

When [lightweight] thin film stock is used, meaning having thicknesses [less than] from 0.5 mil thick to about 2 mil thick, the layer 32 around the forming roller 16 [can include no additive due to the greater inability for the film stock to retain heat energy or] can include an additive such as metal or silica, but be formed to a [greater] preferred thickness around the forming roller. A layer 32 is preferred having a thickness between approximately 1/32 and 1/16 of an inch depending on the cure zone range provided by the structure of the particular machine.

For example, assume an air-cushioning producing machine of the preferred arrangement including a forming roller 16 having a diameter of 3⅛ of an inch, rotating at approximately 21 RPM, and using a film stock having a thickness of 0.5 mils, the weld zone (the amount of time after nipping) is about 10 arc degrees and the cure zone range in arc degrees is 20 degrees as shown in FIG. 11 between 150 and 180 degrees from zero. With this particular example, the [preferred] layer [is] may be pure silicone without conductive enhancing additives and the preferred thickness of the layer to "hold" the conducted heat at the surface of the layer 32 for 30 arc degrees is 1/16. For thicker film material, such as 2 mils thick, a layer 32 made from a compound of silicone rubber and fumed silica (30% fumed silica particles (sub-micron size) by weight to 70% of gum silicone rubber) is used to control the temperature of the surface of the layer 32 of the forming roller 16 during the weld and cure zones. Various mixtures of the rubber silicone and the silica particles will yield different heat conductive characteristics of the surface of the forming roller 16. The greater the amount of conductive silica added to the layer 32 the more conductive the surface and the less heat the surface will retain. It has been found that silica mixtures of up 50% by weight work best as thermal insulators, after which the layer becomes too heat conductive and provides no usable delay of heat dissipation into the core. Metal particles can also be used effectively up to about 50% by weight with the base gum silicone rubber. Such metals as aluminum, brass and copper are contemplated. As taught by U.S. Pat. No. 4,500,353, different amounts of metallic particles added to a base rubber material will effect the heat conductance characteristics of the resulting compound. If the welded laminate is still molten, for example at the 180 degree point of the forming roller 16 (where the laminate is drawn from the surface of the layer 32), the layer 32 is too thick or contains insufficient amounts of heat conductive enhancing additives, retaining too much absorbed heat and preventing dissipation to the core.

Continuing with the individual components of the present machine, as shown in FIGS. 1 and 2, the heat-softened film 12 wraps around a majority of the forming roller 16. As shown in FIG. 11, the heat-softened film contacts the forming roller 16 at degree point 0 (zero degrees). Approximately between 0 and 150 degrees from initial film contact, the vacuum operation activates and draws the adjacent portion of heat-softened film 12 into the effected row of cavities 30. The thin layer 32 helps maintain the heat-softened temperature of the film between 0 degrees and the point of vacuum forming. Preferably at a point around 150 degrees of roller rotation, the forming roller 16 and the adjacent heated roller 24 makes "line" surface contact. During the entire procedure, the formed air-pockets are kept relatively cool and therefore result in fully inflated air-cushioning bubbles, a desirable characteristic for effective packaging dunnage. After the welding procedure of the two adjacent films 12, 24 at the point of surface contact, it is preferred that the formed and welded air-cushioning laminate remain in contact against the surface of the layer 32 of the forming roller 16 until the delay period of heat conductance created by the layer 32 has ended and the weld has cooled to a point that the laminate can be lifted from the surface of the layer 32 without damage to the sealed region. This point of separation of the laminate and the forming roller 16 is at the end of the cure zone, approximately 180 arc degrees from point zero.

The formed, welded and cured (set) air-cushioning laminate is preferably drawn away from the surface of the layer 32 between 180 and 200 arc degrees by a hollow chill roller 38 whose function is to bring the temperature of the laminate material down to room temperature (or usable temperature). The chill roller 38 can be cooled in a similar fashion to the cooling of the forming roller 16 using a cooling medium such as a air fluid, water or refrigerant. Air can be blown into the hollow core of the chill roller 38 to dissipate collected heat or a liquid heat exchange arrangement can be incorporated to absorb the collected heat.

The formed laminate 36 is then guided by guide rollers 44, 45 and 47, 48 to a conventional cutting apparatus for selectively cutting the laminate across its width, parallel to the central axes of all the rollers. The final air-cushioning laminate is preferably collected by a driven collecting axle (not shown). In another embodiment, two driven collecting axles are positioned at remote ends of a supporting member. The supporting member is biased into a rotation which causes the exiting laminate to become taut while it is being rolled onto the collecting one of the collecting axles. As the collecting axle fills, the supporting arm can be rotated so that the increasing diameter of the collecting supply roll of dunnage does not interfere with the surface of the machine. At the desired moment, the dunnage material can be cut using the cutting apparatus 50, 52 and the collected supply roll removed. As the freshly cut dunnage end continues to feed from the machine, the end can be secured to the other rotating collecting axle and collected thereon, while the completed dunnage supply is removed from the first collecting axle. Again, the supporting arm can be slowly rotated to accommodate the increase in the diameter of the accumulating supply roll.

Figure 3:
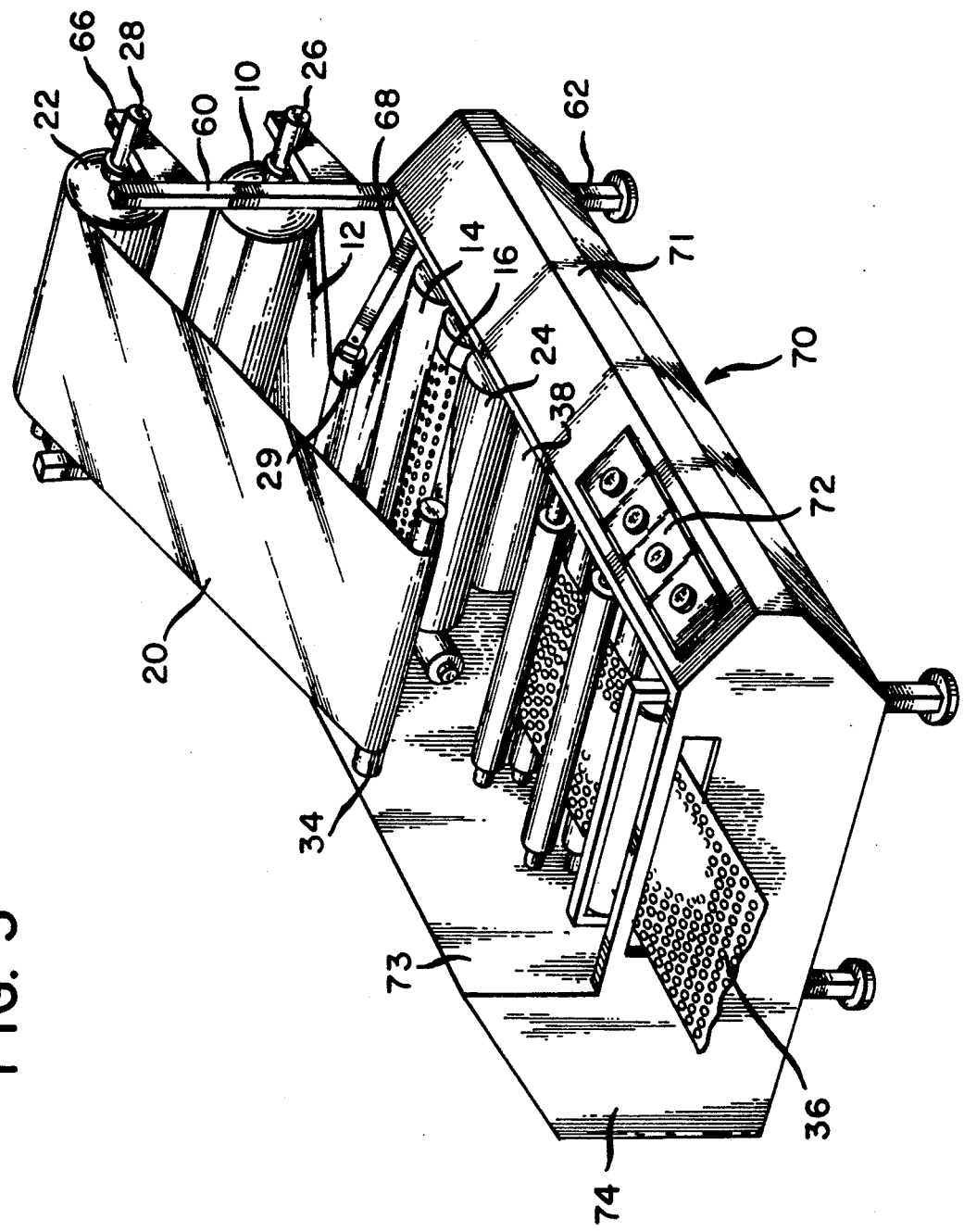
FIG. 3 is a perspective view of the present invention assembled in a housing.

The apparatus of FIGS. 1 and 2 is shown in FIG. 3 in an enclosure and support frame as supplied to the customer. Rolls 22 and 10 are shown with shafts 28 and 26 as carried on a support stand 60 which may be integral with legs 62. The legs 62 are adjustable to accommodate uneven floor areas. The support frame preferably includes extending brackets which have cutout sections The cutout sections are adapted to receive and retain the shafts supporting the supply rolls. The outside case or enclosure which, apart from cosmetics, functions as a guard of the mechanism, and is identified as 70. This enclosure has a front portion 71 where controls 72 are preferably located and a rear portion 73 which extends upwardly sufficiently to enclose drive and support means for one end of the rollers. The outside case 70 is preferably made from any lightweight strong and thin material such as sheet aluminum, steel or plastic.

Figure 4:
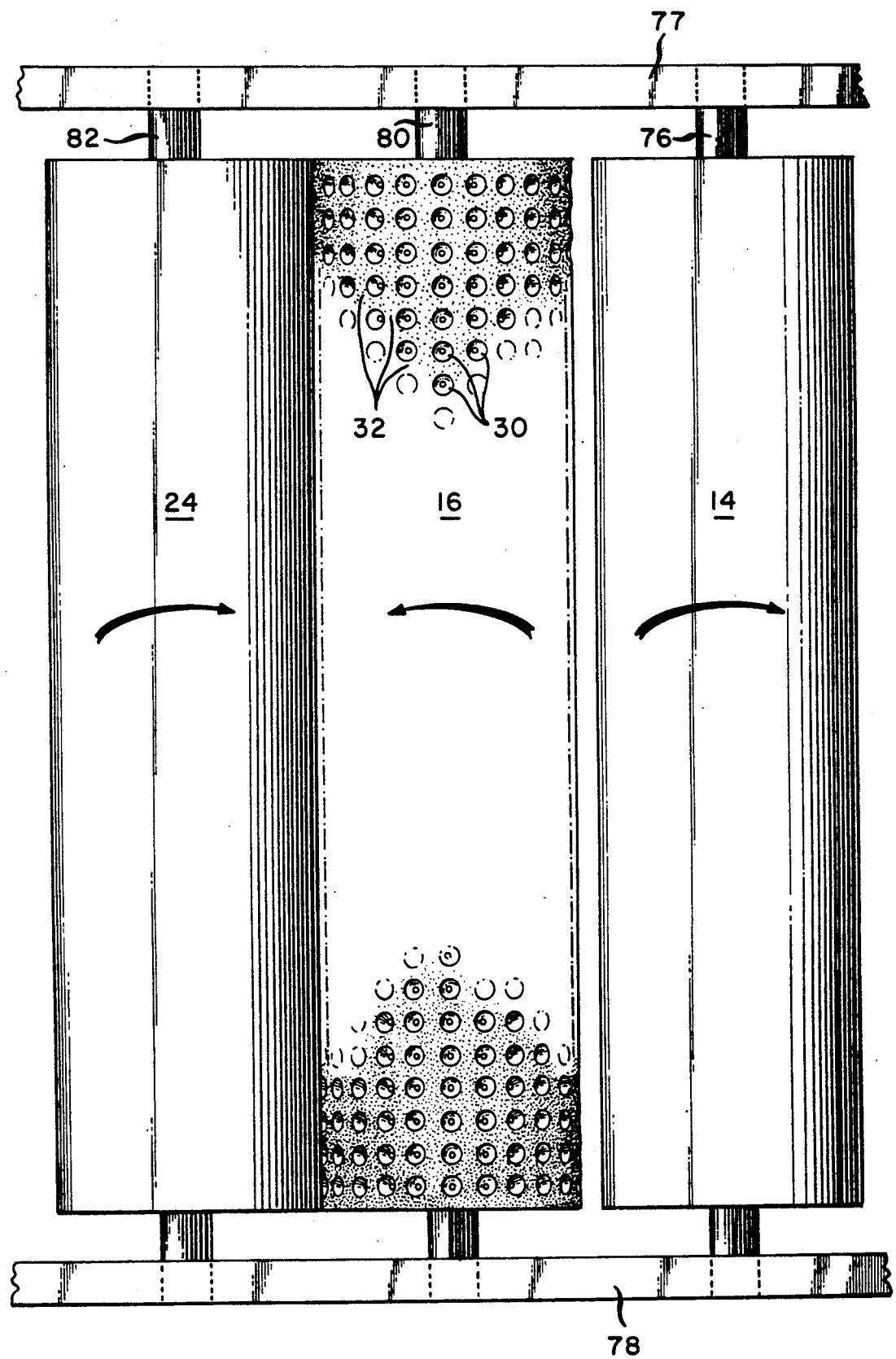
FIG. 4 is a plan view of a forming roller and a heated roller of FIG. 1, showing their positional relationship.

FIG. 4 is a top view of the rollers shown in FIGS. 1, 2, and 3 in which heated roller 14 is shown supported by and rotates about a shaft 76. A frame assembly 77, 78 is used to support the three shafts described hereinafter in reference to FIG. 4. The forming roller 16 lies adjacent to the heated roller 14 and is supported by and rotates about a shaft 80. The forming cavities 30 which form the "open" air-pockets into the plastic film is shown disposed along the surface of the layer 32 of the forming roller 16 in rows that are parallel to the shafts 76, 80. Located on the surface 33 of the forming roller 16 around the cavities 30 is the insulating/resilient layer 32 of predetermined thickness. Heated roller 24 is located adjacent the forming roller 16, opposite to the heated roller 14. During operation, heated roller 24 is in close proximity to the surface 33 of the forming roller 16 so that pressure is exerted on the resilient layer 32 of the forming roller 16. This pressure helps ensure that the welding of the two interposed plastic films is strong and that all the "open" air-pockets become sealed. The pressure between the surfaces of the forming roller 16 and the heated roller 24 is adjustable so that the amount of compression between the rollers can be controlled and varied to achieve the desired weld/seal characteristic. Heated roller 24 is supported by and rotates about a shaft 82. It is preferred that the two heated rollers 14 and 24, and the forming roller have equal diameters and rotate about axes which are coplanar.

Figure 5:
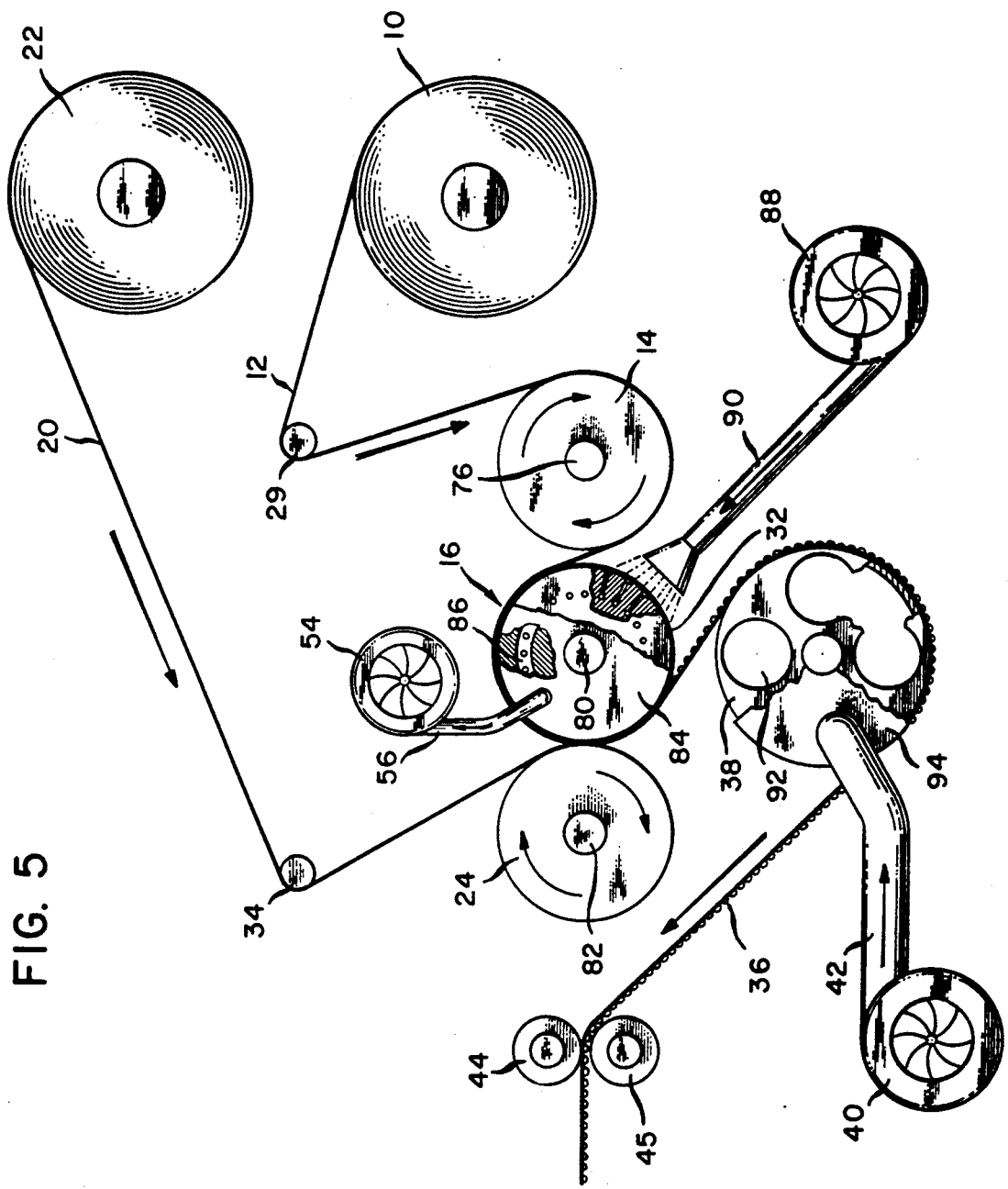
FIG. 5 is a side, diagrammatic view of a second embodiment of the present invention, particularly used for thin thermoplastic supply films.

FIG. 5 incorporates the basic concept of the present invention, as described above into another embodiment. This particular embodiment is suited for air-cushioning machines that are to be operated intermittently, such as less than 20 minutes at a time.

Similar to the arrangement of FIGS. 1 and 2, rolls 10 and 22 supply two webs of thermoplastic film, film 12 and film 20, respectively. The film 12 is fed around the idle roller 29 and around the first heated roller 14 where it is pre-heated and softened to a forming temperature. The film 12 is then directed around the forming roller 16. The forming roller 16, in this embodiment preferably has a silicone layer of approximately one thirty-second to one sixteenth of an inch in thickness. Vacuum is generated by pump 54, causing air to be drawn from one preselected row of cavities. The vacuum pump 54 communicates with the forming roller 16 through conduit 56. The conduit 56 is attached to a sliding valve member including an end plate 84 selectively communicating with [of] the forming roller 16. The end plate 84 is non-rotating, fixed relative to the frame 77, 78. The end plate 84 lies adjacent to a rotatable end 87 of the forming roller 16 and includes an arcuate vacuum-conductive channel 86. The channel 86, as shown in FIG. 8 (in phantom) is recessed along the inside surface of the fixed end plate 84. Each row of cavities within the forming roller 16 is connected by way of a cavity passage 89 to a row passage 96. The row passage 96 provides fluid communication between every cavity within the particular row and the vacuum source. Each row passage 96 terminates at the rotatable end 87 of the forming roller 16 adjacent to the fixed end plate 84. The row passages 96 are exposed to the end plate 84 in a circular arrangement, whose radius equals the radius of the arcuate channel 86 in the end plate 84.

In operation, the vacuum pump 54 generates a vacuum through the conduit 56 and throughout the curved vacuum channel 86 of end plate 84. The position of the forming roller 16 relative to the fixed end plate is of such close tolerance that substantially all of the vacuum within the vacuum channel is applied to those row passages whose open ends are exposed within the vacuum channel 86. As the forming roller 1 rotates, vacuum is applied to the preselected rows of cavities whose respective row passage open ends are within the vacuum channel 86. When any particular row is aligned within the channel 86, vacuum will be applied to the cavities within the particular row until the same row ends fluid communication with the channel by leaving it. The cavities 30 which are under the influence of vacuum draw the adjacent heat-softened plastic film 12, forming it with "open" air-pockets. The channel 86 preferably covers 180 degrees of arc of the forming roller 16 which gives the heat-softened film 12 sufficient time to form. As shown in FIG. 11, the vacuum channel 86 is positioned adjacent to the forming roller 16 so that the cavities are in communication with the channel and vacuum for approximately 150 degrees prior to the line of contact (the nipping point) and about 30 degrees after the nipping point.

As shown in FIG. 5, an added blower 88 and conductor 90 is provided. Air generated by the blower 88 is applied to the exposed surface of the layer 32 of the forming roller 16 (the portion not in contact with film 12). The purpose of this blown air is to cool the outside surface 33 of the forming roller 16, including the insulative/resilient layer 32. This additional cool air not only helps cool the forming roller 16 and prevent its overheating, but also helps cool the vacuum pump 54 which draws a great amount of heat from within the forming roller 16. The cavity passages 89 in this embodiment are preferably larger in diameter so that a greater amount of cooling air, either drawn in by the vacuum or blown in by the blower 88 can pass through the core of the forming roller 16 and sufficiently cool the forming roller 16. With continuous-duty air-cushioning producing machines it is preferred that the cooling method used employ a circulating liquid such as water or freon through the forming roller 16 adapted to accept such a liquid flow, as shown in FIG. 9. Known methods can be applied to the forming roller 16 and the cooling roller 38 to accept the alternative cooling fluid, as applicable (i.e., use of water seals, O-rings).

The hollow cooling roller 38 is also air cooled in this embodiment. The hollow cooling roller 38 includes large exposed openings or passages 92 which accept the flow of cooling air which, in this case, is provided by a blower 40 via a conduit 42. In a similar fashion to the vacuum application to the forming roller 16, an end of the cooling roller 38 rotates adjacent to a stationary end plate 94 which receives the cooling air conduit 42 and communicates the blown air generated into and through each hollow opening or passage 92 as they align with the conduit outlet and as the cooling roller turns.

Referring to FIGS. 6, 7, and 8, details of one embodiment of the forming roller 16 is shown. As shown in FIGS. 6 and 7, the forming roller 16 is provided with an outer coating or layer 32. This layer 32, as discussed above is preferably made from a resilient, thermal insulating material such as silicone rubber of a predetermined and consistent thickness. The layer 32 is provided around the cavities 30, not within them. If such a layer 32 was disposed within the cavities 30, the air within the formed air-pockets would become heated owing to the thermal insulating effect of the rubber preventing dissipation of surface heat to the cooler core of the forming roller 16. It is important that the delay of thermal conductance from the heated roller 24 occur along the surface of the forming roller 16 around the cavities 30 so the air-pockets are kept cool and therefore result in large fully inflated bubbles and so that the area around the air-pockets becomes hot enough to form a good quality weld.

Each cavity 30 is sized and shaped according to the desired size and shape of the finished bubble. As shown in FIG. 6, the inner (closer to the shaft 80) end of each cavity 30 is in fluid communication with the row passage (longitudinal conductor) 96 by way of cavity passage 89. The end plate 84 shows the aligned relationship between the row passages 96 and the arcuate vacuum channel 86. As discussed above, the row passages 96 communicate with one end of the forming roller 16, adjacent to the end plate 84. In one embodiment, the row passages 96 are sealed (plugged by plug 98) at the other end of the forming roller 16, opposite to the end plate 84 so that all vacuum formed within the row passages reaches the cavities 30 and does not "escape" through any other openings to the row passages. However, another embodiment of the present forming roller 16 provides a carefully sized opening to each row passage 96 at the end opposite the end plate 84 of the forming roller 16. The opening (not shown) is not large enough to alter the forming effect of the vacuum on the plastic during the forming procedure, but is large enough to carry any excess heat away from the forming roller 16 during arc degrees that the film is covering the cavities 30 such as between 0 and 150 arc degrees. This embodiment therefore uses the vacuum supply as a forming agent and as a cooling agent thereby, eliminating complex forming roller coolers.

As discussed above, in such an embodiment, depending on the output and size of the machine (as well as the type of film stock used), the forming roller 16 does not need any heating supply or any cooling supply other than that provided by the vacuum system. The resulting machine is simpler and more compact than prior art machines.

With another embodiment of the present forming roller 16, the arcuate channel 86 activates vacuum within row passages 96 and respective cavities 30 within an arc zone of rotation which is prior to the zero degree point of rotation, i.e., before the first film 12 makes contact with the surface of the forming roller. Within this arc zone, the cavities will not retain the applied vacuum, allowing the surrounding atmosphere to attempt to equilibrate the vacuum of the vacuum pump 54. The result is a flow of air through the "open" cavities 30, through the row passages 96, through the connected vacuum channel 86, the conduit 56 to the pump 54. This reverse flow of equilibrating air cools the region within and around each effected cavity 30 just prior to contact with a preheated portion of first film 12. The vacuum supplied cooling effect provides an inexpensive method to prevent the forming roller 16 from overheating and to ensure that the cavities 30 are cool enough to receive the new film 12.

The end plate 84 is provided with a wiping seal located between the end plate and the end surface of the adjacent forming roller 16 so that the arcuate channel 86 accurately directs the vacuum within the channel 86 to the appropriate row passages 96 as the forming roller 16 rotates. As discussed above, the channel preferably communicates with only one half of the row passages 96 at any given time and roller position, however, the channel 86 could communicate with more or less row passages 96 as design considerations warrant. As the forming roller 16 rotates, one row passage 96 enters the channel 86 and introduces the vacuum of the channel 86 to all the cavities located along that particular row passage 96. The entering row passage 96 replaces a row passage 96 that leaves the channel 86 and is "cut off" from any vacuum influence by the wiping seal (not shown).

FIG. 7 shows an enlarged view of the surface region of the present forming roller 16. As shown, the resilient-/insulative layer 32 does not extend into the cavities 30 and only resides along the outer surface 33 of the forming roller 16, around the cavities. As mentioned above and described in greater detail below, the purpose of the layer 32 is two fold. First, it provides a cushioning effect between the surface of the forming roller 16 and the abutting heated roller 24, and secondly, (and more importantly) creates a thermal resistive layer which will effectively "hold" heat conducted from the heated roller 24 so that the first film 12 can reach the necessary welding temperature without heating the forming roller 16 and will maintain the welding temperature during the preferred 10 arc degree weld zone. After the 10 arc degree zone, the nipped portion of the laminate enters a setting or cure zone during which the layer slowly allows the surface of the layer 32 to cool as the heat slowly dissipates into the core of the forming roller 16.

The insulative layer 32 acts as a controlled insulator, one that will retain heat on [the] surface [33 of the forming roller 16] but only for a predetermined period of time or roller rotation.

The layer 32, as described above is preferably silicone rubber with a suitable additive such as fine particles of a metal or silica to control its heat conductivity. The procedure for preparing rubber with such an additive is disclosed in U.S. Pat. No. 4,500,353. It is important that the rubber layer 32 does not extend into any of the cavities 30.

The preferred method of securing the insulating layer 32 to the surface of the forming roller 16 is to first prepare the surface 33 for the layer by applying a suitable adhesive depending on the type of coating applied. Such an adhesive holds the rubber layer to the surface 33 of the forming roller 16 and should be applied only around the cavities 30. The forming roller 16 is then positioned onto a lathe and rotated about its central axis at a sufficient rate so that when a mixture of silicone rubber gum, an insulator enhancer (as discussed above, such as silica) and an appropriate catalyst to cure the rubber after a shelf-life period is applied to the spinning surface 33 the rubber will not spin off the roller but will flow along the surface 33. The rate of rotation of the roller 16 should be fast enough so that the flowing rubber does not enter the cavities 30 to any great degree that would severly clog them. After the silicone is evenly applied, it is undisturbed until the catalyst cures it to a more solid form. The roller 16 is then machined on the lathe so that an accurate layer of consistent and predetermined thickness is formed. Any excess rubber within the forming roller cavities 30 is removed (this should be easy because of the lack of an adhesive) and the entire roller is vulcanized or heated to a sufficient temperature to completely set and stengthen the rubber onto the surface 33 of the forming roller 16.

Referring to FIG. 8, the alignment relationship between the vacuum channel 86 and the row passages 96 is again shown.

As mentioned above, the forming roller 16 can be cooled using fluids other than flowing air, or in addition to cooling air (either self generated or effective generated through application of vacuum). Water can be used with a modified version of the forming roller 16 that was shown in FIGS. 1-8.

In FIG. 9 and 10 another embodiment of the forming roller 16 is shown. In this embodiment, the forming roller 16 is intended to be cooled, as discussed above by flowing a liquid through the central core. A forming roller 16 is shown including, as in the air cooled embodiment of FIG. 6, a plurality of cavities 30 connected to a series of parallel row passages. The main difference between the air cooled forming roller and the liquid cooled roller is that the center of the liquid cooled roller contains a cylindrical passage 100 which has a larger diameter than a shaft 102 which supports the roller 16, positioned along the central axis of the roller 16. The shaft 102 includes a hollow portion 103 at either end entering the forming roller core, and a solid portion 104 located within the fluid passage 100. The shaft 102 allows for fluid communication between the hollow portions at either end and the central passage 100 by way of side openings 106 through the shaft 102 transverse to the central axis and located substantially at the inner end of the hollow portion of each end. With this arrangement, fluid may be pumped directing conduit (not shown) to one end of the shaft 102, through the hollow portion 103, through the side opening 106 into the central cooling chamber 100 on the outside of the solid portion 104, running the length of the core of the forming roller 16 to the opposite end where the heated fluid enters the side opening 106, the hollow portion 103 and out the end of the hollow shaft to receiving conduit (not shown). The heat energy collected b the cooling fluid is drawn from the forming roller and is removed at a radiator portion in-line with the circulating fluid (not shown).

An appropriate seal 108 such as an O-ring seal can be used to seal the central cooling chamber 100 from the exterior of the core, thereby allowing shaft and forming roller rotation without leakage of the cooling fluid. In one version (shown in FIG. 10) the seal 108 is located within each of two end caps 110 along an inner cylindrical surface which is sized to grip the shaft 102. The end caps 110 are secured by a bolt or a locking pin 112 to the adjacent ends of the forming roller 16. The shaft 102 is secured to the forming roller 16 so that the forming roller 16 will rotate with rotation of the shaft 102.

FIG. 11 is a side view of the forming portion of the present invention. Forming roller 16 is shown adjacent to and in between the heated roller 24 and the heated roller 14. The purpose of FIG. 11 is to show the various regions along the surface of the forming roller 16 in arc degrees, as a selected portion of air-cushioning material moves around the forming roller 16 during machine operation.

As discussed above, as the first film 12 leaves the heated roller 14 it reaches the surface of the layer 32 of the forming roller 16 at a preheat temperature of about 250 degrees F. and contacts the surface of the forming roller 16 at arc degree point zero. In the preferred embodiment of this invention, the vacuum channel 86 is aligned with only those row passages 96 that are located within the arc-degree range between zero degrees and 180 degrees. In other embodiments, the vacuum channel 86 can encompass a greater arc degree range such as 210 degrees and begin about 30 degrees before the zero degree point of contact (at 330 arc degree point) so that the vacuum system, described above, can draw in air through the cavities 30, the cavity passages 89 and the row passages 96 that are within this 30 degree arc of the forming roller 16. The vacuum drawn air cools the cavities 30 so that during forming between zero degrees and 150 degrees and heat sealing between 150 degrees and 180 degrees, the air within the air-pocket will remain relatively cool and will therefore encapsulate a greater amount of air per volume. The vacuum can also be in communication with the cavities during the entire 360 degree rotation of the forming roller 16 so that more cooling can be provided to the surface and core of the forming roller 16, therefore providing an air cooled air-cushioning producing machine which is inexpensive and more compact than a water cooled version. Especially, after the film laminate is drawn from the surface and cavities 30 leaving the cavities open to vent.

Continuing with FIG. 11, the film 12, once in contact with the surface of the forming roller 16 will be immediately drawn into the adjacent cavities 30 by the communicating vacuum. The vacuum will "form" the film 12 to the shape of the cavities 30 and will hold the shape during the duration of the forming and cooling area of the forming roller 16, between zero arc degrees and 150 arc degrees. The temperature of the formed film 12 decreases from the zero point of contact to the 150 arc degree point, as heat is drawn from the film 12 to the cooler adjacent roller 16. The forming roller 16 can be air cooled, or circulating-liquid cooled and can operate with a core temperature of below 32 degrees F. The present air-cushioning producing machine can operate without preheating the forming roller 16, as required by the prior art machines.

By the time the formed portion of the film 12 reaches the 150 degree point, the air within each air-pocket is relatively cool and will provide a fully inflated bubble once the open air-pocket is sealed.

At the 150 degree point of the forming roller 16, the surface of the forming roller 16 makes contact with the adjacent heated roller 24. The heated roller 24 is heated to a temperature of approximately 300 degree F. and carries along its surface the second supply film 20, in a molten state. At the 150 degree point of the forming roller 16, the two films come into contact with each other and "nip" together. In order to form a perfect nip (seal), the two films 12, 20 must be pressed together and must be kept at a weld-temperature of about 250 to 300 degrees F. for about 10 arc degrees of the forming roller and gradually cooled to a set or cure temperature of less than 150 degrees F. during the next 20 arc degrees of the forming roller 16.

It is the layer 32 along the surface of the forming roller 16 that maintains the relatively high weld-temperatures during the 150 to 160 arc degree range and automatically provides the gradual cooling of the surface of the layer 32 to set the films 12, 20 during the 160 to 180 arc degree range.

The entire forming, sealing and setting process is complete within 180 arc degrees from the point of contact. The remaining 180 arc degrees is used to cool the surface of the layer 32 of the forming roller 16. Shortly after the 180 degree point, the sealed air-cushioning material is cool enough to be lifted away from the surface of the layer 32 of the forming roller 16. The chill roller 38 draws the formed air-cushioning material from the forming roller 16 and further cools it to a usable temperature which is near room temperature (70 degrees F.). As described above, the remaining process includes directing and either cutting or collecting the air-cushioning material as demanded.

FIG. 12 is a graph showing the relative core, surface and film temperatures (as an example) at continuous arc degree increments along the forming roller 16 during operation of the present air-cushioning machine. The temperature values will vary depending on the operation time, but will vary consistently with respect to each arc degree position.

At point zero arc degrees, in this example the core temperature is 40 degrees F., the film 12 is 240 degrees F. and the surface temperature is about 90 degrees F. By 45 arc degrees, the core remains 40 degrees F. due to either the controlled air or liquid cooling, the film 12 is formed and has cooled to about 210 degrees F., and the surface of the forming roller 16 has warmed to about 165 degrees F. The layer 32 is designed to retain the forming temperature until the film 12 has formed, at which point the heat residing on the surface of the forming roller 16 will dissipate into the core. At 90 arc degrees from zero, the core remains about 40 degrees F., the formed film 12 has cooled to about 150 degree F. and the surface has also cooled to about 130 degrees. Just prior to the 150 arc degree nipping point at 140 degrees, the core temperature is 40 degrees F., the surface of the layer 32 has cooled to about 105 degrees F. and the film has cooled to about 110 degrees F. During the weld seal zone, the core remains 40 degrees F., the film 12 and the surface of the layer 32 very quickly rise to about 300 degrees F. due to the direct contact of the 300 degree F. heated roller 24. The layer 32 retains the absorbed heat of the film 12 until about 160 arc degrees at which point the heat energy slowly dissipates into the cooler core and cools to about 140 degrees F. at the 180 arc degree mark. The film 12 is removed at a temperature below 150 degrees F. and the surface of the layer 32 is cooled to about 90 degrees F. during the remaining 180 arc degrees of the cycle.

The layer 32 can also include a release material such as tetrafluoroethylene or similar material to prevent adhesion of the films to the surface of the rollers.

A method of forming air-cushioning material comprises the steps of:

supplying a first film of a thermoplastic material to a forming roller, said thermoplastic material being of the type which includes thermoforming properties when heated to a thermoforming temperature, said forming roller including a plurality of cavities disposed along a surface and a layer along said surface around said cavities, said layer being made from a thermo-resistive material and adapted to retain heat energy at said surface for a predetermined duration, afterwhich said layer allows said heat energy to dissipate from said surface;

supplying a second film of a thermoplastic material to a heated roller, said second thermoplastic film being of the type which includes thermosealing properties when heated to a thermosealing temperature;

applying vacuum to said cavities of said forming roller so that said first film becomes formed within said cavities thus creating a plurality of air-pockets;

heating said heated roller to said thermosealing temperature;

pressing said first film having said plurality of air-pockets to said second film which is heated to said thermosealing temperature such that said heat of said heated roller conducts to said surface of said forming roller where said thermo-resistive layer delays dissipation of said conducted heat, said delayed conducted heat allowing said first film to heat to said thermosealing temperature so that said first film can seal to said second film, thereby closing said air-pockets;

cooling said sealed films to a usable temperature; and providing cutting means to cut said sealed and cooled films to a prescribed length.

What is claimed is:

1. In an on-demand apparatus for producing air-cushioning dunnage from two sources of flexible thermoplastic film, said flexible film of the type which may be combined to provide isolated fully air-filled cells, said apparatus comprising:

a means for holding a source of a first film, said first film being a thermoplastic material having at least thermoforming and heat-welding properties when heated to a predetermined temperature;

a means for holding a source of a second film, said second film being a thermoplastic material having at least heat-welding properties when heated to a predetermined temperature;

means for independently feeding a web of said first film and a web of said second film to said apparatus;

means for softening a preselected portion of said first film to a temperature sufficient to provide said first film with said thermoforming properties;

a forming roller of a selected diameter, said forming roller including a central core and an outer surface, said outer surface having a plurality of selectively shaped and spaced cavities therein, said forming roller being adapted to receive said heat-softened portion of said first film at a first point with respect to said forming roller, said forming roller being made of a conductive material and further adapted for being fully and constantly cooled to a predetermined cold temperature at its central core first and conducting said cold temperature to its outer surface;

means for creating a vacuum within said cavities located within a forming portion of said forming roller, said created vacuum being sufficient to draw said heat-softened portion of said first film into said cavities, said drawn first film taking a shape similar to the shape of said cavities within said forming portion of said forming roller;

a heated pressure roller selectively positioned adjacent to said forming roller, said heated pressure roller being adapted to receive said second film so that said first film and said second film are in contact at a contact portion of said adjacent rollers, said contact portion being located at a second point with respect to said forming roller, heat generating from said heated pressure roller conducts through said second film and said first film in a direction towards said core of said forming roller, said heated pressure roller further adapted for heating said second film substantially to a heat-weld temperature prior to said second film supply reaching said contact portion of said heated pressure roller;

a thermo-resistive layer including silica particles dispersed in a rubber base for providing a predetermined conductivity, said thermo-resistive layer having a predetermined thickness, said thermoresitive layer selectively covering said outer surface of said forming roller around said cavities, said thermo-resistive layer being fixedly attached while simultaneously being in full contact with said outer surface around said cavities said thermo-resistive layer being such that said conduction of said generated heat energy from said adjacent heated pressure roller toward said cold core of said forming roller is delayed for a predetermined duration at said thermo-resistive layer on said outer surface of said forming roller around said cavities, said duration of said heat conduction delay being controlled by the thickness and conductivity of said thermo-resistive layer, said duration being sufficient to heat any undrawn portions of said first film to said heat-weld temperature so that said first film is heat-welded to said second film substantially at said contact portion of said adjacent rollers, said duration of said delay ending after said heat-weld is rotated by and with said forming roller for a predetermined distance beyond said contact point, said conductivity of said thermo-resistive layer thereafter allowing residual heat energy in said heat weld to continue towards said cold core of said forming roller;

said predetermined thickness of said thermo-resistive layer providing for a major portion of said shape of said drawn portion of said first film to be only in contact with the shape of its associated cavity of said plurality of shaped and spaced cavities in said forming roller;

wherein said first point is sufficiently distant from said second point for cooling only said drawn portion of said first film and air interior of said cells formed in said first film to substantially a cold condition, as and when said major portion of said shape of said drawn portion is in contact with said cavity, said cold condition providing for more dense air to fill said cells and subsequently providing a fully inflated air cell;

means for driving said forming roller and said heated pressure roller at a selected rate of rotation;

means for said fully cooling of said forming roller to said predetermined cold temperature, said fully cooling means adapted for constantly cooling said air in said cells, said fully cooling means further adapted for subsequently cooling said thermo-resistive layer and said heat-welded portion of said first film and said second film to a temperature sufficient to easily remove said dunnage from said forming roller; and a second cooling means for removing any residual heat from a major exposed surface of said second film of said finished cushioning dunnage subsequent to said easy removal and prior to exiting the apparatus, said second cooling means providing for the minimizing of any thermal distortion of said second film.

2. An apparatus as recited in claim 1 wherein said selected diameter of said forming roller is between the range of 3 in. and 7 in. for providing a compact apparatus.

3. An apparatus as recited in claim 1 wherein said means for softening includes:
   a heating roller having its axis parallel to said forming roller, said heating roller arrayed for providing a predetermined spaced relationship with said forming roller, said heating roller further adapted for having an internal heating source; and
   an idler roller having a fixedly adjustable mounting, said mounting providing for radial disposition of said idler roller about the axis of said heating roller for adjusting the wrap of said first film on and around said heating roller.

4. An apparatus as recited in claim 3 wherein said heated pressure roller is adjustably mounted for selectively and uniformly varying a contact pressure being applied to said second film and said first film.

5. An apparatus as recited in claim 4 which further includes a second idler roller, said second idler roller being radially and adjustably disposed about the heated pressure roller for varying the amount of wrap of said second film on said heated pressure roller.

6. An apparatus as recited in claim 4 wherein said first point is located in substantial alignment with a horizontal axis of said forming roller, and said sufficient distance being at least 150 degrees of arc, said sufficient distance being arrayed to carry said first film over a top portion of said forming roller prior to contacting said second film at said second point.

7. An apparatus as recited in claim 6 which further includes:
   a means for removing and rewinding the finished dunnage product subsequent to said second cooling means, said means for removing being further adapted for maintaining a taut condition in said dunnage; and
   a means for selectively severing selected portions of said dunnage at predetermined intervals.

8. An apparatus as recited in claim 6 wherein said heated roller, said heated pressure roller, and said forming roller have substantially equal diameters, said equal diameters being in a range between 3 in. and 7 in. in magnitude.

9. An apparatus as recited in claim 1 wherein said means for creating a vacuum includes a sliding valve member, said sliding valve member adapted for engaging selected portions of at least one end of said forming roller.

10. An apparatus as recited in claim 1 wherein said cooling means being adapted for circulating a cooling fluid through said core of said forming roller, said cooling means and said cooling fluid being arrayed for maintaining said predetermined cold temperature as low as 32 degrees F.

11. An apparatus as recited in claim 1 wherein said thermo-resistive layer is attached to said outer surface of said forming roller by vulcanizing so as to provide said fixedly attaching and said full contact.

12. An apparatus as recited in claim 1 wherein said predetermined thickness is as thin as 1/32 of an inch (0.8 mm) for providing said maximum contacting of said major portion of said shape of said drawn portion with said shape of its associated cavity.

13. An apparatus as recited in claim 1 wherein a weight percentage of silica particles in said thermo-resistive layer is between 30 and 50 percent by weight.

14. A method for producing a fully air-filled cushioning dunnage from two sources of flexible thermoplastic films, said method including:

providing a substantially continuous source of a first film, said first film having at least thermoforming and heat welding properties;

providing a substantially continuous source of a second film, said second film having at least heat welding properties;

independently and simultaneously feeding a web of said first film and a web of said second film;

softening said first film substantially to a predetermined thermoforming temperature;

rotating a forming roller and a heated pressure roller at a predetermined like peripheral velocity, said forming roller having a central core, and an outer surface, said outer surface being selectively covered with a thermo-resistive layer, said thermo-resistive layer including silica particles in a rubber base and being fixedly attached while being in full contact with said outer surface of said forming roller;

maintaining said central core and said outer surface at a predetermined cold temperature by and with a cooling means communicating with said central core;

receiving said softened first film onto said rotating forming roller at a first point with respect to the forming roller;

thermoforming said first film into a plurality of cavities formed into said outer surface of said forming roller by applying a vacuum to selected cavities, said thermoforming brining a major portion of said thermoformed first film into substantially full contact with its associated cavity of said plurality of cavities;

cooling only said major portion of said thermoformed portions of said first film and air contained within said thermoformed portions in said cavities by maintaining said application of said vacuum while simultaneously carrying said thermoformed first film on said forming roller from said first point to a sufficiently distant second point, said cavities being maintained below a predetermined cold temperature while simultaneously maintaining unformed portions of said first film at an elevated temperature, by contacting said thermo-resistive layer;

heating said second film substantially to a heat welding temperature by wrapping said second film around a heated pressure roller for a selected arc of contact;

simultaneously abutting and heat welding said second film to said first film substantially at said second point by applying a contact pressure by and with said heated pressure roller while simultaneously delaying the conduction of the welding heat at said thermo-resistive layer by providing said thermo-resistive layer with predetermined thickness and conduction properties;

allowing said heat welded portions of said second film and said first film to set by carrying said dunnage on said forming roller for a predetermined distance beyond said second point;

cooling said heat welded portions of said dunnage to a predetermined temperature sufficient for easy removal of said dunnage from said forming roller by carrying said dunnage beyond said set point while simultaneously allowing any residual heat in said thermo-resistive layer to conduct into said cold forming roller; and removing said dunnage from said forming roller by and with a chill roller while simultaneously cooling any exposed major surface of said second film by wrapping said major surface around and maintaining contact with said chill roller for a predetermined arc.

15. A method as recited in claim 14 wherein the step of softening said first film further includes the step of wrapping said first film around a heater roller for a predetermined arc of contact.

16. A method as recited in claim 15 which includes the further step of adjustably varying the arc of contact between the first film and the heated roller by providing an idler roller roller which is radially and adjustably disposed about the axis of said heated roller 17. A method as recited in claim 16 which further includes the step of varying the wrap Of said second film around said heated pressure roller by providing a second idler roller, said second idler roller being adjustably and radially disposed about the axis of said heated pressure roller.

18. A method as recited in claim 14 which includes the following step of removing and rewinding the finished dunnage product subsequent to wrapping around said chill roller while simultaneously maintaining a taut condition in said dunnage.

19. A method as recited in claim 18 which includes the step of severing selected portions of said dunnage by carrying said dunnage through a cutting means located between said chill roller and said rewinding of said dunnage.

20. A method as recited in claim 14 which includes the step of maintaining said cavities of said forming roller below said cold temperature by flowing a cooling fluid through a cylindrical chamber in said forming roller, said cylindrical chamber being concentrically disposed with respect to the central axis of said forming roller.

* * * * *

UNITED STATES PATENT AND TRADEMARK OFFICE
CERTIFICATE OF CORRECTION

PATENT NO. : 5,188,691

DATED : 2-23-93

INVENTOR(S) : Garry L. Caputo

It is certified that error appears in the above-identified patent and that said Letters Patent is hereby corrected as shown below:

On the title page, Item [63]:

Should read as follows:

"Continuation of Ser. No. 382,579, Jun. 21, 1989, aboandoned, which is a continuationin-part of Ser. No. 213,254, Jun 29, 1988, abandoned, which is a continuation of Ser. No. 78,385, Jul. 27, 1987, abandoned."

This correction would agree with Col. 1 lines 5 - 10 of the Description.

Col. 7 line 16, should read as follows:

"surface of the layer 32 from"

Col. 7 Line 19, should read:

"of layer 32 and the adjacent film to reach and"

Col. 9 lines 21 - 27, should read:

"When thin film stock is used, meaning having a thickness from 0.5 mil thick to about 2 mil thick, the layer 32 around the forming roller 16 can include an additive such as metal or silica, but be formed to a preferred thickness around the forming roller."

UNITED STATES PATENT AND TRADEMARK OFFICE
CERTIFICATE OF CORRECTION

PATENT NO. : 5,188,691

DATED : 2-23-93

INVENTOR(S) : Garry L. Caputo

It is certified that error appears in the above-identified patent and that said Letters Patent is hereby corrected as shown below:

Col. 9 line 40, should read as follows:
"this particular example, the layer may be"

Col 11, line 65: --"[of]"--- should be deleted

Col. 12 line 20 should read as follows:
"uum channel 86. As the forming roller 16 rotates, vac-"

Col. 14 lines 44-47 should read as follows:

The insulative layer 32 acts as a controlled insulator, one that will retain heat on its surface, but only for a predetermined period of time or roller rotation."

Col. 15 line 50: --"b"-- should be --"by"--.

UNITED STATES PATENT AND TRADEMARK OFFICE
CERTIFICATE OF CORRECTION

PATENT NO. : 5,188,691

DATED : 2-23-93

INVENTOR(S) : Garry L. Caputo

It is certified that error appears in the above-identified patent and that said Letters Patent is hereby corrected as shown below:

Column 21:
Claim 14, line 36, ---"brining"-- should read --bringing--.

Column 22:
Claim 17, line 34, --"Of"-- should read --of--.

Signed and Sealed this

Twenty-first Day of December, 1993

Attest:

BRUCE LEHMAN

Attesting Officer     Commissioner of Patents and Trademarks